United States Patent [19]

Foote

[11] Patent Number: 5,111,694

[45] Date of Patent: May 12, 1992

[54] ACCELEROMETER WITH REBALANCE COIL STRESS ISOLATION

[75] Inventor: Steven A. Foote, Issaquah, Wash.

[73] Assignee: Sundstrand Corporation, Rockford, Ill.

[21] Appl. No.: 569,398

[22] Filed: Aug. 17, 1990

[51] Int. Cl.⁵ .......................................... G01P 15/13
[52] U.S. Cl. ................................... 73/497; 73/517 B
[58] Field of Search ........................... 73/517 B, 497

[56] References Cited

U.S. PATENT DOCUMENTS

| | | | |
|---|---|---|---|
| 3,673,873 | 7/1972 | Estes et al. | 73/517 B |
| 3,702,073 | 11/1972 | Jacobs | 73/517 B |
| 4,592,234 | 6/1986 | Norling | 73/517 B |
| 4,697,455 | 10/1987 | Norling | 73/497 |
| 4,726,228 | 2/1988 | Norling | 73/517 B |
| 4,766,768 | 8/1988 | Norling et al. | 73/517 B |
| 4,854,169 | 8/1989 | Sakuma et al. | 73/517 B |
| 4,932,258 | 6/1990 | Norling | 73/497 |
| 5,024,089 | 6/1991 | Norling | 73/517 B |

Primary Examiner—Hezron E. Williams
Assistant Examiner—Craig Miller
Attorney, Agent, or Firm—Christensen, O'Connor, Johnson & Kindness

[57] ABSTRACT

An improved technique for mounting a coil to a paddle in a force rebalance accelerometer so as to provide relief from temperature induced strains without increasing the mass of the proof mass. The coil is mounted to the paddle at a plurality of mounting sites on the paddle, at least one of which is connected to the paddle by suspension means compliant for movement in the plane of the paddle. In a preferred arrangement, three mounting sites are used, two of which are moveable towards and away from the third, fixed mounting site.

8 Claims, 3 Drawing Sheets

ACCELEROMETER WITH REBALANCE COIL STRESS ISOLATION

FIELD OF THE INVENTION

The present invention relates to accelerometers in which a force rebalance coil is mounted to a proof mass.

BACKGROUND OF THE INVENTION

A prior art accelerometer with high performance potential is described in U.S. Pat. No. 3,702,073. The accelerometer comprises three primary components, a reed, and upper and lower stators or magnetic circuits between which the reed is supported. The reed includes a movable paddle that is suspended via flexures to an outer annular support ring, such that the paddle can pivot with respect to the support ring. The paddle, flexures and support ring are commonly provided as a unitary structure composed of fused quartz. A plurality of mounting pads are formed at spaced-apart positions around the upper and lower surfaces of the support ring. These mounting pads mate with inwardly facing surfaces of the upper and lower stators when the accelerometer is assembled.

Both upper and lower surfaces of the paddle include capacitor plates and force rebalance coils, also known as torque coils. Each force rebalance coil is positioned such that its central axis is normal to the paddle, and parallel to the sensing axis of the accelerometer. Each stator is generally cylindrical, and has a bore provided in its inwardly facing surface. Contained within the bore is a permanent magnet. The bore and permanent magnet are configured such that an associated one of the force rebalance coils mounted on the paddle fits within the bore, with the permanent magnet being positioned within the cylindrical core of the coil. Current flowing through the coil produces a magnetic field that interacts with the permanent magnet, to produce a force on the paddle. Also provided on the inwardly facing surfaces of the stators are capacitor plates configured to form capacitors with the capacitor plates on the top and bottom surfaces of the paddle. Movement of the paddle with respect to the upper and lower stators results in a differential capacitance change.

In operation, the accelerometer is affixed to an object whose acceleration is to be measured. Acceleration of the object along the sensing axis results in pendulous, rotational displacement of the paddle, coils and capacitor plates (collectively referred to as the "proof mass") with respect to the support ring and the stators. The resulting differential capacitance change caused by this displacement is sensed by a feedback circuit. In response, the feedback circuit produces a current that, when applied to the force rebalance coils, tends to return the proof mass to its neutral position. The magnitude of the current required to maintain the proof mass in its neutral position provides a measure of the acceleration along the sensing axis.

An important characteristic of an accelerometer of the type described above is its immunity to errors due to thermal stress. Thermal stress results from the fact that different parts of the accelerometer are composed of materials that have different coefficients of thermal expansion. For example, the reed is preferably composed of fused quartz, whereas the coil is typically composed of copper, and may be mounted on an aluminum coil form. The coefficient of thermal expansion of fused quartz is 0.5 ppm/°C., while the coefficients of expansion of copper and aluminum are 17 and 23 ppm/°C., respectively. Thus temperature change will result in stress at the paddle/coil, or paddle/coil form interface. This stress can warp the paddle and the flexures that mount the paddle, and result in offset and hysteresis errors in the accelerometer output.

One traditional approach to minimize temperature induced stress at the coil/paddle interface is to mount the coil or coil form on a support that is attached to the paddle only at a small circular area near the central axis of the coil. This approach minimizes the difference between the coil and paddle movement caused by a given temperature change. Another prior approach to coil mounting that reduces stress is shown in U.S. Pat. No. 4,697,455. In the accelerometer depicted therein, a plurality of mounting fingers descend from the coil form, and attach to a base that in turn is mounted to the paddle. Although this design effectively removes stress due to thermal expansion mismatch, it is a relatively heavy design that adds a significant amount of mass to the proof mass. There is therefore a need for a coil mounting approach that minimizes thermal stress, but that is also light in weight and thereby well adapted for use in high g accelerometers.

SUMMARY OF THE INVENTION

The present invention provides an improved technique for mounting a coil to a paddle in a force rebalance accelerometer. The invention provides for strain relief for temperature changes, without requiring an increase in the mass of the proof mass.

The invention is applicable to an accelerometer that comprises a paddle suspended from a support for movement with respect thereto. The paddle here is used in its broad sense to include any movable member, regardless of whether such movement is rotational, translational, or a combination of both. The accelerometer also includes coil means mounted to the paddle. The coil means may either comprise a freestanding coil, or a coil mounted on a coil form. In accordance with the invention, the coil means is mounted to the paddle at a plurality of mounting sites on the paddle. At least one mounting site is connected to the paddle by suspension means that is compliant for movement of the mounting site with respect to the paddle in the plane in which the paddle lies. Such movement of the mounting site can therefore accommodate thermally induced strains.

In a preferred embodiment, the coil means is mounted to the paddle at first, second, and third mounting sites. The first and second mounting sites are connected to the paddle by first and second suspension means, respectively. Each suspension means is compliant for movement of its respective mounting site in a direction toward or away from the third mounting site. In another preferred aspect, each mounting site is connected to the paddle by a pair of beams that are connected to the mounting site at its opposite corners. An embodiment is also disclosed in which a portion of the paddle between the mounting sites is removed, to thereby decrease the mass of the paddle.

DETAILED DESCRIPTION OF THE INVENTION

Figure 1:
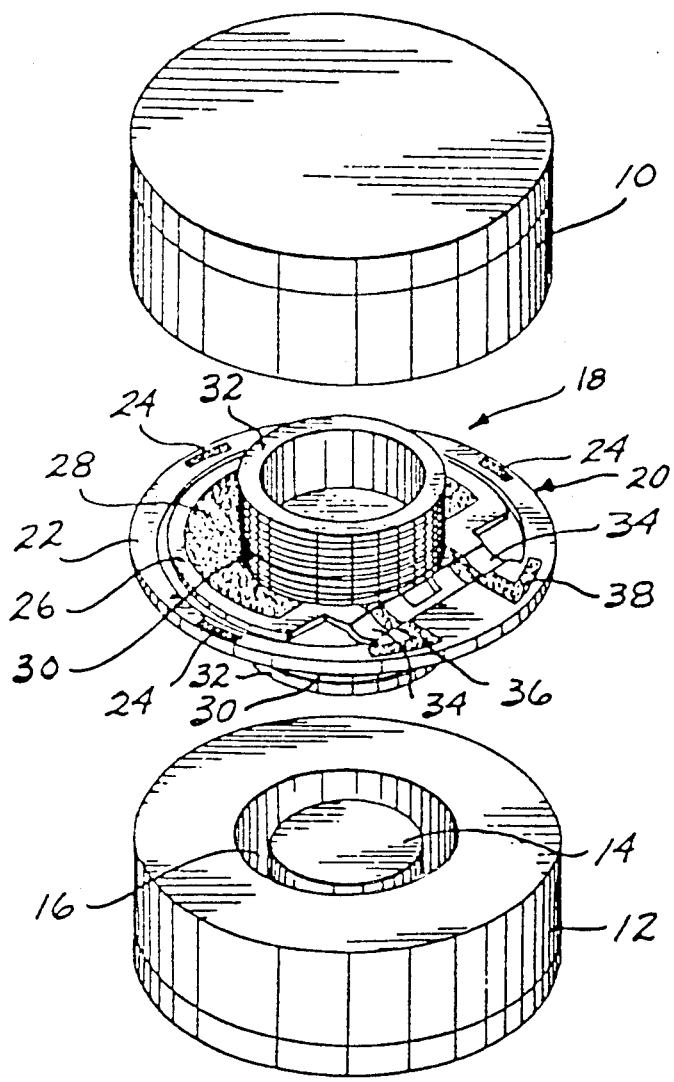
FIG. 1 is a perspective view of a prior art force rebalance accelerometer.

FIG. 1 illustrates a force rebalance accelerometer known in the prior art. This accelerometer includes an upper stator 10 and a lower stator 12. The inwardly facing surface of each stator includes a bore within which is positioned a permanent magnet capped by a pole piece, as illustrated by pole piece 14 within bore 16. Also shown in FIG. 1 is reed assembly 18 that is mounted between the upper and lower stators. Reed assembly 18 comprises reed 20 that includes outer annular support ring 22 and paddle 26 supported from the support ring by flexures 34. The reed is preferably fabricated from a single piece of fused quartz. Support ring 22 includes three mounting pads 24 on its upper surface, and a similar set of three mounting pads (not shown) on its lower surface. When the accelerometer is assembled, mounting pads 24 contact the upper and lower stators, and provide support for the reed assembly.

Capacitor plate 28 is deposited on the upper surface of paddle 26, and a similar capacitor plate (not shown) is deposited on the lower surface of the paddle. The capacitor plates cooperate with the inwardly facing surfaces of upper and lower stators 10 and 12 to provide a capacitive pick-off system. Also mounted on either side of paddle 26 are coil forms 32 on which force rebalance coils 30 are mounted. As is well understood in the servoed instrument art, coils 30 cooperate with the permanent magnets in the stators and with a suitable feedback circuit to retain paddle 26 at a predetermined position with respect to support ring 22. Thin film pick-off leads 36 and 38, and similar leads (not shown) on the lower surface of reed 20, provide electrical connections to the capacitor pick-off plates and force rebalance coils.

In the design of an accelerometer of the type shown in FIG. 1, it is nearly impossible to use the same material for all of the different components. For example, reed 20 is preferably composed of fused quartz, coil 30 is preferably composed of copper, and coil form 32 is preferably made from aluminum. As a result, there will invariably be mismatches in the coefficients of thermal expansion of adjacent components. Such mismatches can deform the components and cause errors in a number of different ways, depending on the type of suspension and displacement pick-off method used.

In the accelerometer of FIG. 1, the coil forms are typically mounted directly to the paddle with a compliant elastomer. The mismatch in thermal coefficient between aluminum and fused quartz is large, and the compliant elastomer layer does not relieve all of the stress at this interface. The remaining stresses that are not cancelled by the opposing coil can deform the capacitor pick-off plates or the flexures. Either of these deformations can cause a bias in the accelerometer output. In addition, distortions which change the position of the coil windings can cause scale factor errors. These error sources are even more significant in a design in which only a single force rebalance coil is used, because of the asymmetry of the resulting stress applied to the paddle.

Figure 2:
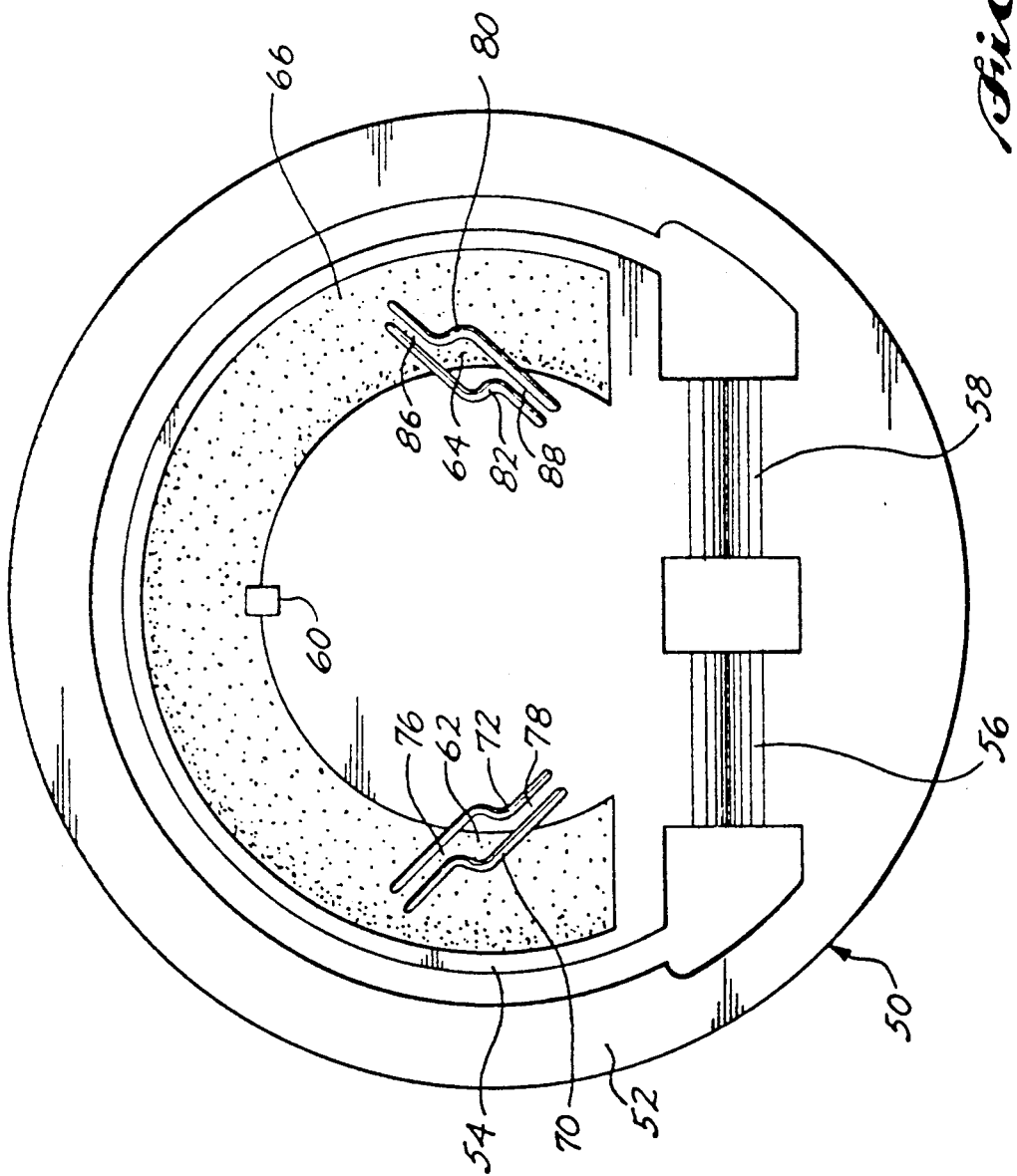
FIG. 2 is a top plan view of a reed formed in accordance with the present invention.

FIG. 2 illustrates a preferred embodiment of the coil mounting system of the present invention. In particular, FIG. 2 depicts reed 50 comprising support ring 52 from which paddle 54 is suspended by flexures 56 and 58. The paddle includes three mounting sites for mounting the coil to the paddle: fixed mounting site 60 and movable mounting sites 62 and 64. An arcuate capacitor plate 66 is deposited on the paddle, the capacitor plate generally extending around the area at which the coil will be mounted.

Fixed mounting site 60 may simply be a designated area of the paddle surface, or it may be raised with respect to the remainder of the paddle surface, as further described below. Movable mounting site 62 is formed by etching a pair of slots 70 and 72 through the paddle, the slots being shaped so as to form mounting site 62 joined to the remainder of the paddle by beams 76 and 78. A second pair of slots 80 and 82 are also formed in the paddle, slots 80 and 82 forming mounting site 64 joined to the remainder of the paddle by beams 86 and 88. Beams 76 and 86 and portions of movable mounting sites 62 and 64 may be plated, such that they form a portion of capacitor plate 66.

The aspect ratios of beams 76, 78, 86, and 88 are such that the beams are relatively compliant for flexing in the plane of the paddle, normal to the lengthwise axes of the beams, but relatively noncompliant for bending out of the plane of the paddle, i.e., normal to the plane of the drawing. In addition, the beams are dimensioned such that they are relatively noncompliant along their lengthwise axes for the expected loads due to thermal stress. Beams 76 and 78 are oriented such that fixed mounting site 60 is positioned approximately along the direction in which beams 76 and 78 are compliant, i.e., the direction normal to the lengthwise axes of these beams. Fixed mounting site 60 is also located along the compliant direction of beams 86 and 88. The beams are therefore compliant for movement of the movable mounting sites towards and away from the fixed mounting site. As a result, when a temperature change results in differential thermal expansion or contraction of the coil or coil form with respect to the paddle, mounting sites 62 and 64 move towards and away from fixed mounting site 60, thereby providing strain relief, and minimizing the coupling of thermally induced strains into the reed or coil.

The embodiments shown in FIG. 2 applies equally to accelerometers in which the coil is mounted on a coil form that is in turn attached to the paddle, and to embodiments in which a freestanding coil is mounted directly to the paddle. In both cases, it may be preferable to form small raised areas at the mounting sites, to provide clearance between the coil form or coil and the paddle. However, nonraised mounting sites may be preferred in some applications, because they provide a larger, flat surface for capacitor plate 66. In such embodiments, small beads of adhesive or preform/epoxy pads may be positioned between the paddle and coil to provide clearance. Alternatively, tooling shims can be used to provide such clearance. The design shown in FIG. 2 applies equally to the case in which only a single coil is mounted to one side of the paddle, or to dual coil designs in which coils are mounted to both sides of the paddle. In the latter case, raised mounting areas may be formed on both sides of each mounting site.

In the embodiment of FIG. 2, the mounting sites are generally rectangular in shape, and the beams attach at opposite corners of each mounting site. Although not required, this arrangement is preferred because it provides better isolation. The reason for this is that the length of a beam effectively shortens when it is displaced normal to its lengthwise axis. Thus if the beam axes were colinear, mounting site displacement would place the beams in tension, and couple some stress into the paddle. The opposite corner attachment avoids this by allowing a small rotation of the mounting site to compensate for the effective beam length change. Preferably, movable mounting sites 62 and 64 are positioned symmetrically with respect to the flexures, so that any residual stresses will be balanced.

Isolation could also be provided for mounting site 60. However, only two compliant mounting sites are needed to provide effective strain relief. Leaving mounting site 60 fixed produces a more rigid structure, and minimizes encroachment of the coil isolation structures onto the capacitor plate area. On the other hand, an advantage of using a compliant support for mounting site 60 is that a temperature change would not change the position of the center of the coil with respect to the paddle. When a compliant support is used for mounting site 60, the compliance of the beams or other structures to which mounting site 60 is attached could be adjusted with respect to the compliance of the beams supporting mounting sites 62 and 64, to compensate for scale factor temperature sensitivity of the accelerometer.

Figure 3:
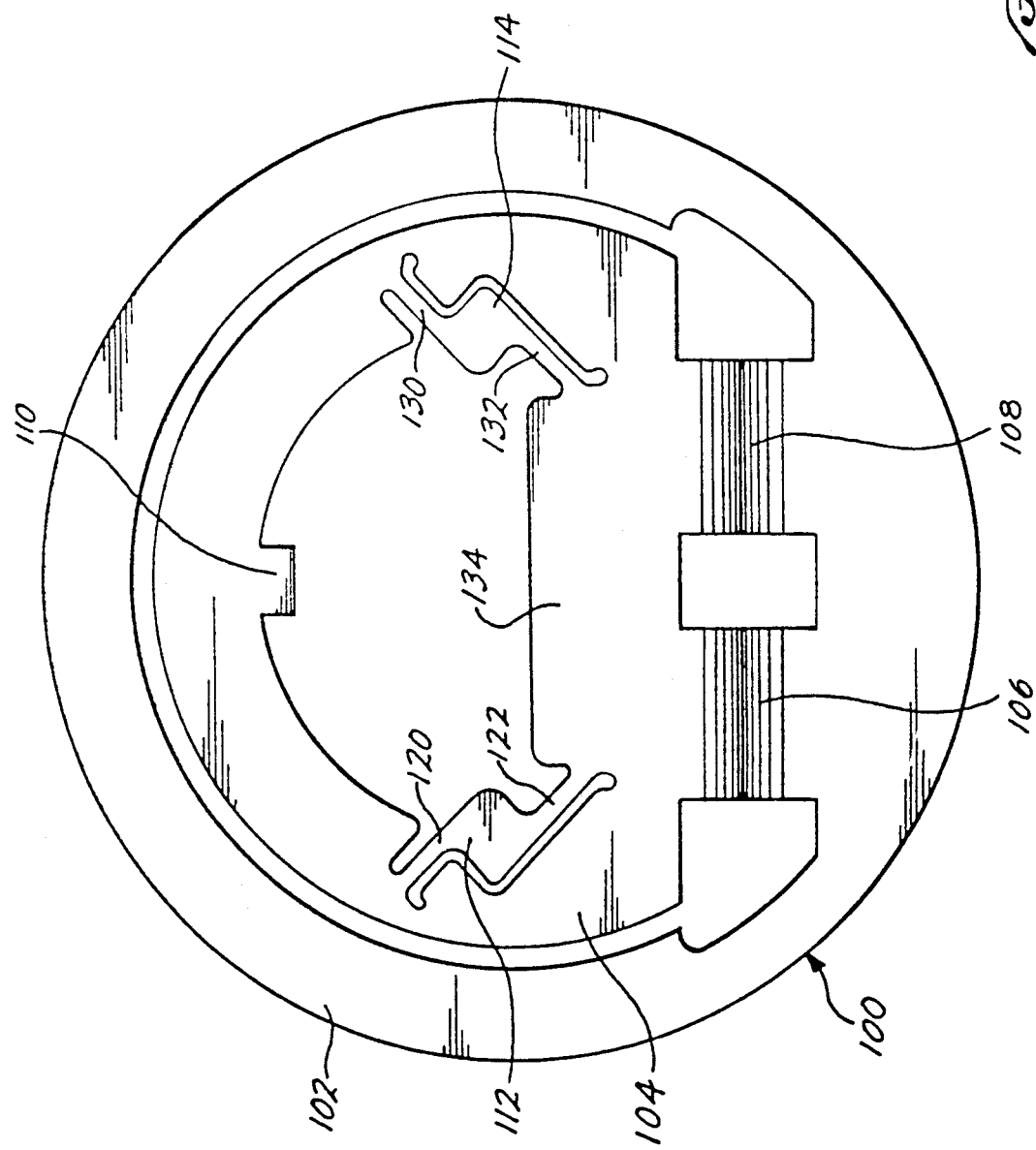
FIG. 3 is a top plan view of a second reed according to the present invention.

FIG. 3 illustrates a second preferred embodiment of the invention. In particular, FIG. 3 depicts reed 100 comprising support ring 102 from which paddle 104 is suspended by flexures 106 and 108. Paddle 104 includes fixed mounting site 110 and movable mounting sites 112 and 114. Mounting site 112 is connected to the remainder of paddle 104 by beams 120 and 122, while mounting site 114 is connected to the remainder of the paddle by beams 130 and 132. The geometry of the mounting sites and beams is essentially identical to that of the embodiment of FIG. 2. However, in FIG. 3, a substantial central portion of paddle 104 has been removed, to further decrease the mass of the paddle and proof mass. A substantial lip 134 is preferably left in the paddle in the vicinity of flexures 106 and 108, to provide additional rigidity in this area.

While the preferred embodiments of the invention have been illustrated and described, variations will be apparent to those skilled in the art. For example, the invention can be applied to any accelerometer in which a coil is mounted to a movable paddle or the like, and is not limited to the illustrated cases in which the paddle is pendulously mounted by flexures. The scope of the invention is therefore to be determined in accordance with the following claims.

The embodiments of the invention in which an exclusive property or privilege is claimed are defined as follows:

1. In an accelerometer comprising a paddle suspended from a support for movement with respect thereto, and coil means mounted to the paddle, the improvement wherein the coil means is mounted to the paddle at a plurality of mounting sites on the paddle, at least one mounting site being non-compliant and, at least one mounting site being connected to the paddle by suspension means, the suspension means being coplanar with the paddle and, being compliant for movement of the mounting site with respect to the paddle in a plane in which the paddle lies.

2. The improvement of claim 1, wherein the coil means is mounted to the paddle at first, second, and third mounting sites, the first and second mounting sites being connected to the paddle by first and second suspension means, respectively, each suspension means being compliant for movement of its respective mounting site with respect to the paddle in said plane.

3. The improvement of claim 2, wherein the first suspension means is compliant for movement of the first mounting site in a direction towards and away from the third mounting site, and wherein the second suspension means is compliant for movement of the second mounting site in a direction towards and away from the third mounting site.

4. The improvement of claim 1, wherein the suspension means comprises a pair of beams connecting the mounting site to the paddle.

5. The improvement of claim 4, wherein the beams are attached to opposite sides of the mounting site.

6. The improvement of claim 5, wherein the beams have respective longitudinal axes that are parallel to but offset from one another.

7. The improvement of claim 6, wherein the mounting site has a generally rectangular shape and includes four corners, and wherein the beams are attached to diagonally opposite corners.

8. The improvement of claim 1, wherein a portion of the paddle between the mounting sites is removed to thereby decrease the mass of the paddle.

* * * * *